United States Patent
Benedictus et al.

[11] Patent Number: 6,116,149
[45] Date of Patent: Sep. 12, 2000

[54] TOASTER

[75] Inventors: Jan H. Benedictus; Klaas Kooijker, both of Drachten, Netherlands

[73] Assignee: U.S. Philips Corporation, New York, N.Y.

[21] Appl. No.: 09/411,465

[22] Filed: Oct. 1, 1999

[30] Foreign Application Priority Data

Oct. 5, 1998 [EP] European Pat. Off. .............. 98203339

[51] Int. Cl.$^7$ ................................................ A47J 37/08
[52] U.S. Cl. .................................. 99/329 P; 99/329 RT; 99/385; 99/389; 99/391; 219/521
[58] Field of Search ........................... 99/389–391, 385, 99/393, 326–333, 396, 400–402; 219/492, 494, 506, 411, 413, 481, 489, 521, 525, 528; 396/365, 373

[56] References Cited

U.S. PATENT DOCUMENTS

| | | | |
|---|---|---|---|
| 2,362,753 | 12/1942 | Huck | 99/329 |
| 2,503,960 | 4/1950 | McCullough | 99/327 |
| 2,673,516 | 3/1954 | Reichold | 99/327 |
| 2,750,876 | 8/1951 | Visos | 99/391 |
| 2,878,748 | 3/1959 | Stanek | 99/329 P |
| 2,920,550 | 1/1960 | Schmall et al. | 99/329 |
| 3,014,419 | 8/1958 | Knapp | 99/327 |
| 3,129,650 | 4/1964 | Visos | 99/329 |
| 3,869,970 | 3/1975 | Eagle | 99/329 RT |
| 3,956,978 | 5/1976 | Borley | 219/502 |
| 4,154,151 | 5/1979 | Mochizuki | 99/329 R |
| 4,188,865 | 2/1980 | Bjarsch | 99/327 |
| 4,510,376 | 4/1985 | Schneider | 219/492 |
| 4,755,656 | 7/1988 | Charlesworth et al. | 219/492 X |
| 4,878,423 | 11/1989 | Bikert et al. | 99/391 |
| 5,072,662 | 12/1991 | Yip | 99/327 |
| 5,095,814 | 3/1992 | Ott et al. | 99/391 |
| 5,598,765 | 2/1997 | Yip | 99/391 X |

FOREIGN PATENT DOCUMENTS 1573011  8/1980  United Kingdom .

*Primary Examiner*—Timothy Simone
*Attorney, Agent, or Firm*—Ernestine C. Bartlett

[57] ABSTRACT

A toaster has a guide mechanism for a slice support (7), which mechanism comprises a substantially U-shaped rod (15) having a central portion (16) parallel to the longitudinal direction of the slice support and having two arms (17, 18) which are each supported in the respective ends (8, 9) of the slice support as well as in a frame (1) of the toaster.

3 Claims, 3 Drawing Sheets

TOASTER

BACKGROUND OF THE INVENTION

The invention relates to a toaster having a frame comprising two frame plates arranged substantially parallel opposite to one another, an elongate slice support situated between the frame plates and extending transversely to the frame plates, means for guiding the slice support up and down opposed by the force of a spring, an actuating element for the slice support, heating means for toasting bread, and means for locking the slice support in and releasing it from a toasting position.

Such a toaster is known from GB-A-1573011. In toasters of this type the slice is placed onto the slice support, after which the slice support is lowered into the toasting position by means of the actuating element. End portions of the slice support engage in a vertical slot in the frame plates for guiding the up and down movement of the slice support. The actuating element is disposed at one side of the slice support. As a result of this, a force is exerted on one side of the slice support when the slice support is lowered. This may cause the slice support to be tilted, as a result of which it may become jammed.

SUMMARY OF THE INVENTION

It is an object of the invention to preclude tilting of the slice support in a toaster of the type defined in the opening paragraph.

To this end, the toaster in accordance with the invention is characterized in that the toaster includes a rectilinear guide mechanism for the slice support, which mechanism comprises a substantially U-shaped rod having a central portion and two arms, the central portion extending parallel to a longitudinal direction of the slice support and the two arms each being supported in the respective ends of the slice support as well as in the frame. The U-shaped rod ensures that the force exerted on the slice support in order to move the slice support downward or upward is substantially equal at both ends of the slice support. As a result of this, the risk of tilting of the slice support is reduced considerably. The location where the force for moving the slice support downward or upward is exerted now has no influence on tilting of the slice support. Moreover, the slice support remains always horizontal.

A preferably used embodiment is characterized in that the central portion of the rod forms the actuating element. The advantage of this is that the actuating element extends over the whole length dimension of the toaster and can therefore be operated very easily.

Another preferably used embodiment is characterized in that the end of each arm of the U-shaped rod of the rectilinear guide mechanism is connected to the respective end of the slice support by means of an additional arm. As a result of this, the central portion of the U-shaped rod can be supported in the frame of the toaster so as to be exclusively rotatable.

BRIEF DESCRIPTION OF THE DRAWINGS

The invention will now be described in more detail with reference to an example shown in the drawings. In the drawings

DESCRIPTION OF THE PREFERRED EMBODIMENTS

Figure 1:
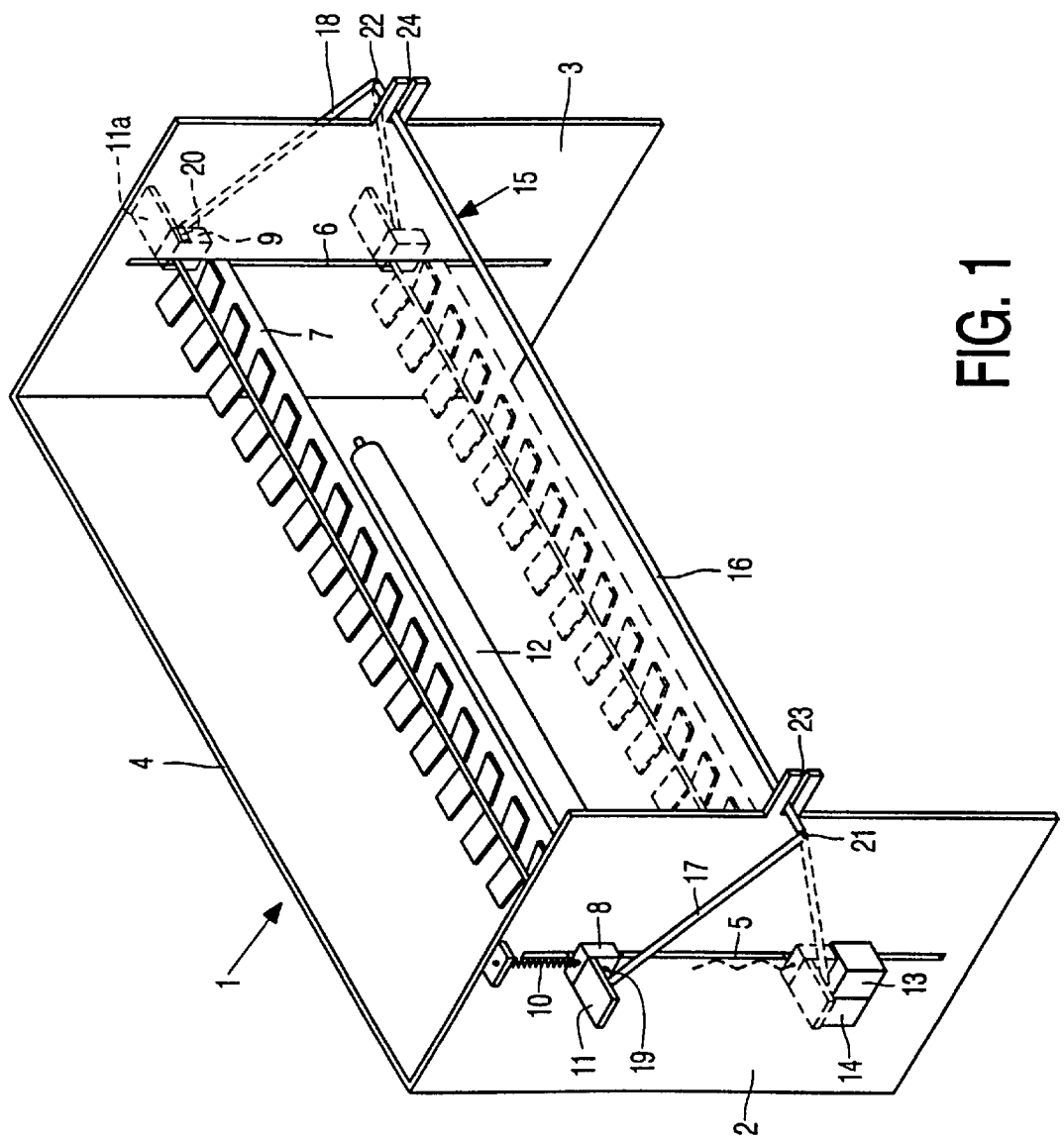
FIG. 1 is a diagrammatic perspective view of a toaster in accordance with a first example.

The toaster shown in FIG. 1 has a frame 1, which comprises at least two, preferably metal, frame plates 2, 3, arranged opposite and parallel to one another and interconnected by means of, for example, plates, rods or strips. In FIG. 1 this connection is shown diagrammatically as a plate 4. Each of the frame plates 2, 3 has a vertical guide slot 5, 6. An elongate slice support 7 extends between the frame plates 2, 3 and transversely to these frame plates and has ends 8, 9 which are slidable in the respective guide slots 5, 6. Thus, the means for guiding the slice support are formed by the guide slots 5, 6 in the frame plates and the ends 8, 9 of the slice support. However, alternatively the means can be formed by, for example, two vertical rods at opposite sides of the frame plates, over which rods the ends of the slice support are slidable. A spring is stretched between the end 8 of the slice support and the frame. The slice support 7 can be slid down and slid up under the influence of the force of the spring 10. For this purpose, an actuating element 11 is mounted on the end 8 of the slice support. The toaster further comprises a heating element 12, which is shown simply as a tubular heating element in FIG. 1. It is obvious that this element may alternatively be, for example, a planar heating element. Obviously, such heating elements are arranged at both sides of the slice to be toasted. Furthermore, there are means for locking the slice support in and releasing the slice support from its toasting position. These means are known per se but are not relevant to the present invention and are therefore only represented diagrammatically as a block 13, 14. The assembly as shown in FIG. 1 is accommodated in a housing, not shown, which has openings for the actuating elements and the slice. It is evident that, alternatively, the frame can directly form the housing.

In accordance with the invention the toaster is provided with a rectilinear guide mechanism for the slice support. This mechanism comprises a U-shaped rod 15 formed by a central portion 16 with two arms 17, 18. The central portion 16 of the rod extends parallel to the longitudinal direction of the slice support 7, while the arms 17, 18 extend parallel to the frame plates 2, 3. However, the arms may each alternatively be arranged at a small angle with respect to the frame plates, but in such a manner that they extend symmetrically with respect to the central portion of the rod. The ends 19, 20 of the arms 17, 18 are connected to the slice support 7 so as to be rotatable about an axis parallel to the slice support. For this purpose, the ends 19, 20 of the arms have been bent at right angles and thus define the axis of rotation of the U-shaped rod in the slice support. The ends 21, 22 of the arms 17, 18, which are interconnected by the central portion 16, are supported in the respective frame plates 2, 3 so as to be rotatable as well as slidable by means of an additional arm (23, 24). When a downward force is exerted on the actuating element 11 in order to move the slice support 7 into its lowered toasting position the force is exerted not only on the end 8 of the slice support but, via the U-shaped rod 15, also on the other end 9 of the slice support. The slice support is urged downward horizontally without tilting. Obviously, this also applies to the upward movement of the slice support. Now it is also possible to provide the other end 9 of the slice support with an actuating element 11', thus enabling the toaster to be operated both from the left and from the right.

Figure 2:
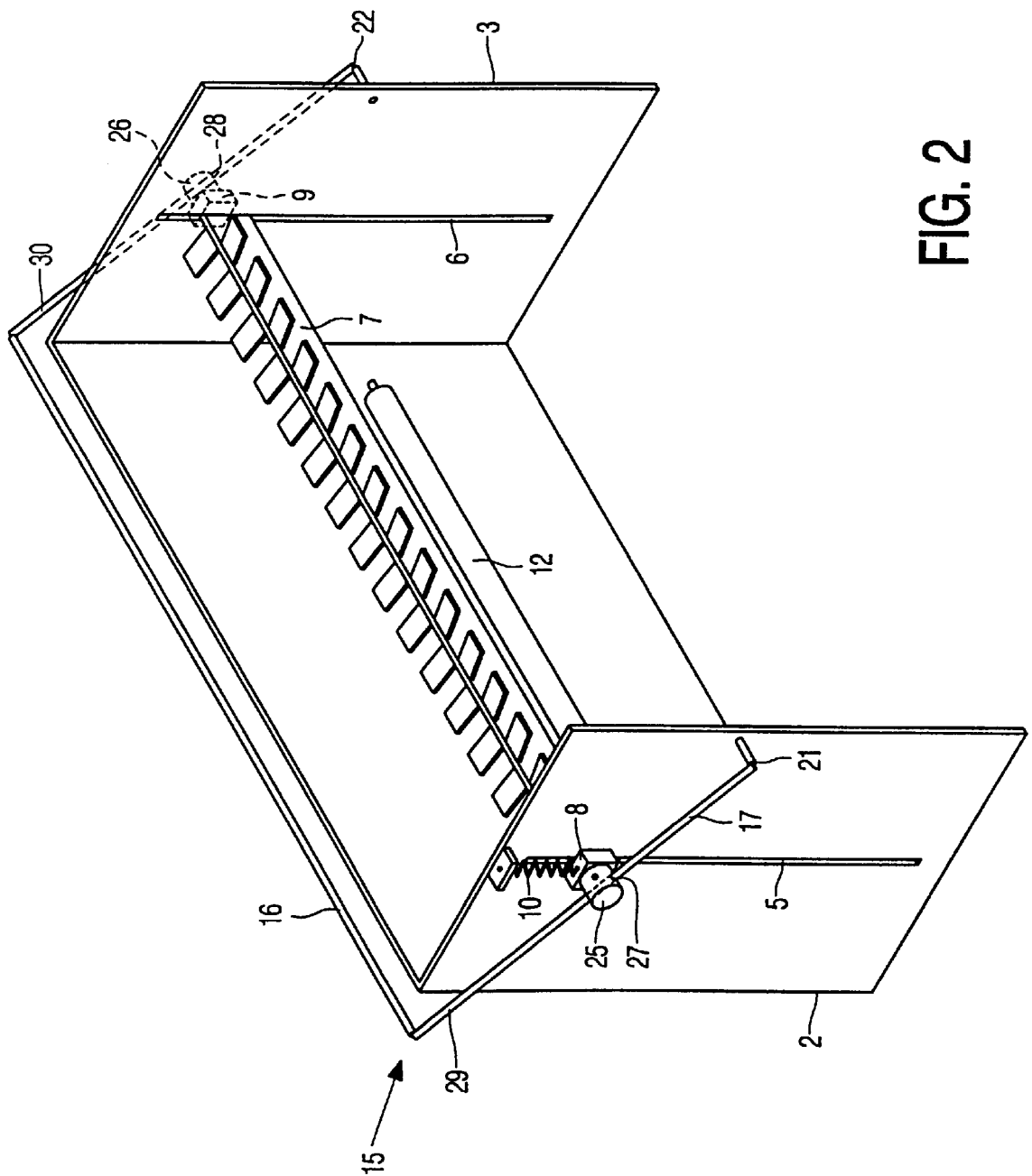
FIG. 2 is a diagrammatic perspective view of a toaster in accordance with a second example.

FIG. 2 shows an alternative for the toaster of FIG. 1. Like parts therein bear the same reference numerals as in FIG. 1.

The ends 8, 9 of the slice support 7 each have a bearing 25, 26 which can rotate about an axis parallel to the longitudinal direction of the slice support and which each have an opening 27, 28 which is oriented transversely to the longitudinal direction of the slice support. The arms 17, 18 of the U-shaped rod 15 engage the openings 27, 28 of the bearing 25, 26 and are slidable therein. The free ends 21, 22 of the arms are supported in the frame plates 2, 3 so as to be exclusively rotatable. The ends of the arms 29, 30 now project from the toaster and are interconnected by the central portion 16 so as to form the U of the rod 15. This central portion now forms a handle for the actuation of the slice support. During the up and down movement of the slice support the arms rotate about the ends 21, 22 and the arms slide in the bearings 25, 26. This also provides an excellent rectilinear guidance of the slice support.

Figure 3:
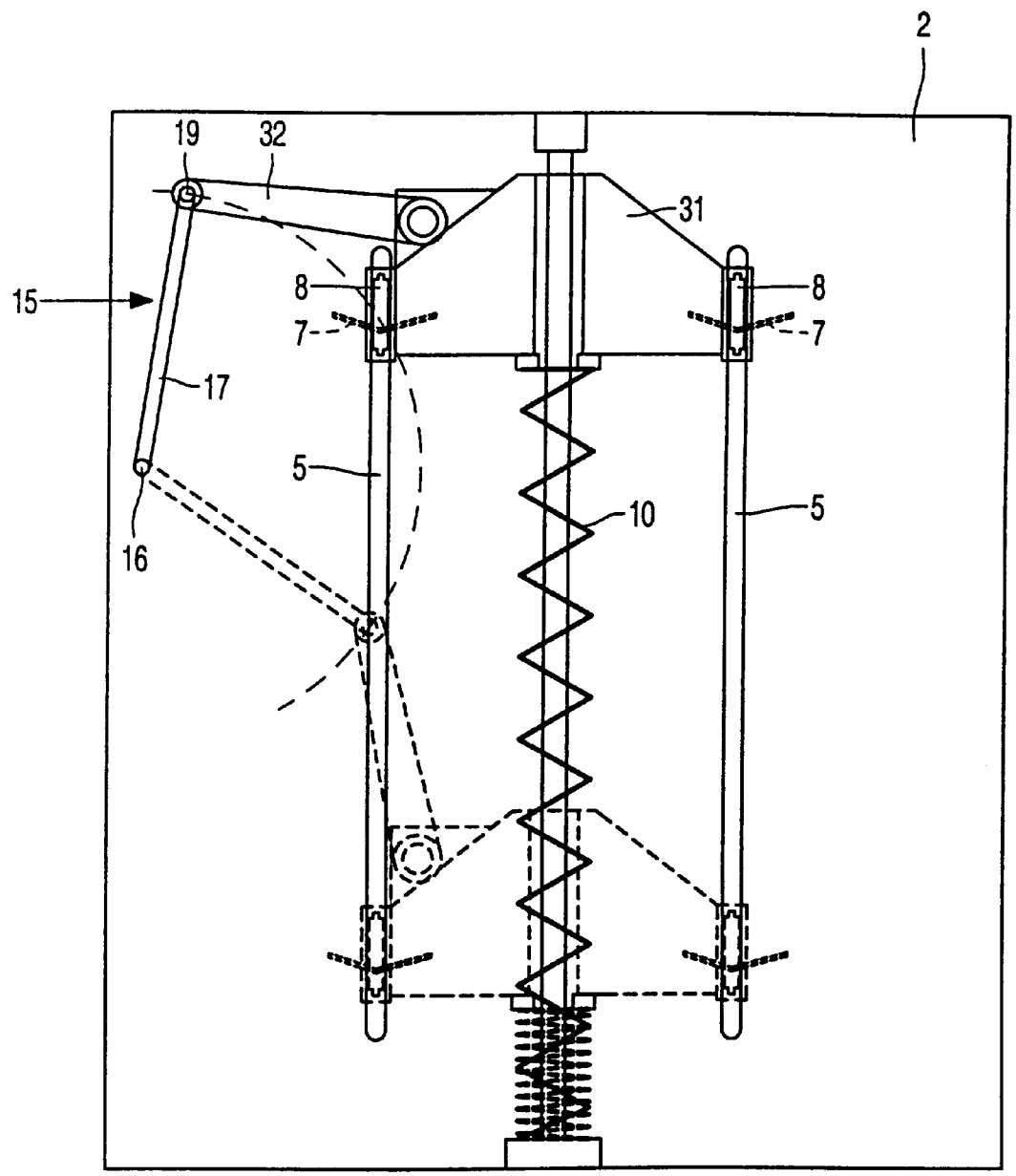
FIG. 3 is a diagrammatic end view of a toaster in accordance with a third example.

FIG. 3 shows a second example of a toaster in accordance with the invention, and, for the sake of simplicity, it shows only a view at the frame plate 2. Again, like parts bear the same reference numerals as in FIG. 1. The toaster now comprises two slice supports 7 whose ends 8 are secured to a flange 31. The frame plate 2 has two guide slots 5. The ends 8 of each slice support engage in the respective guide slots 5. A spring 10, in the present case a pressure spring, is interposed between the flange 31 and the frame. The rectilinear guide mechanism again comprises a U-shaped rod 16 as shown in FIG. 1. However, an additional arm 32 is now disposed between the slice support 7 and the end 19 of each arm 17 of the U-shaped rod 15. The central portion 16 of the U-shaped rod 15 is now supported in the frame, for example in the frame plates 2, 3, so as to be exclusively rotatable. Although this is not shown, such a structure has been provided in a similar manner at the other side of the toaster. When the slice support is moved downward opposed by the force of the spring 10 the U-shaped rod 15 and the additional arm 32 are turned into a position as represented by a broken line. This construction also yields an accurate rectilinear guidance of the slice support.

Sandwich holders are known which can be used in a toaster. Such a sandwich holder is formed by, for example, holder halves in the form of wire racks which are pivotally connected to one another. Between the holder halves a sandwich can be placed. After the two holder halves have been closed the sandwich holder can be placed onto the slice support through the opening of the toaster. The toaster in accordance with the invention is very suitable for use with such a sandwich holder because the slice support with the sandwich holder can simply be lowered into its toasting position without being tilted. This contributes to the ease of operation.

What is claimed is:

1. A toaster having a frame comprising two frame plates arranged substantially parallel opposite to one another, an elongate slice support situated between the frame plates and extending transversely to the frame plates, means for guiding the slice support up and down opposed by the force of a spring, an actuating element for the slice support, heating means for toasting bread, and means for locking the slice support in and releasing it from a toasting position, wherein the toaster includes a rectilinear guide mechanism for the slice support, which mechanism comprises a substantially U-shaped rod having a central portion and two arms, the central portion extending parallel to a longitudinal direction of the slice support and the two arms each being supported in the respective ends of the slice support as well as in the frame.

2. A toaster as claimed in claim 1, wherein the central portion of the rod forms the actuating element.

3. A toaster as claimed in claim 1, wherein the end, of each arm of the U-shaped rod of the rectilinear guide mechanism is connected to the respective end of the slice support by means of an additional arm.

* * * * *